United States Patent [19]

Shibayama et al.

[11] Patent Number: 5,381,466
[45] Date of Patent: Jan. 10, 1995

[54] NETWORK SYSTEMS

[75] Inventors: Shigeki Shibayama, Yokohama; Kazumasa Hamaguchi, Machida, both of Japan

[73] Assignee: Canon Kabushiki Kaisha, Tokyo, Japan

[21] Appl. No.: 219,750

[22] Filed: Mar. 29, 1994

Related U.S. Application Data

[63] Continuation of Ser. No. 654,003, Feb. 12, 1991, abandoned.

[30] Foreign Application Priority Data

Feb. 15, 1990 [JP] Japan ................... 2-35241

[51] Int. Cl.⁶ .................. H04M 1/00; H04M 3/50
[52] U.S. Cl. ........................ 379/88; 379/67; 379/89; 379/96; 379/100
[58] Field of Search ................ 379/67, 88, 89, 52, 379/100, 96; 395/2, 200, 600; 381/36, 44; 370/94.1, 94.2

[56] References Cited

U.S. PATENT DOCUMENTS

| | | | |
|---|---|---|---|
| 4,523,055 | 6/1985 | Hohl et al. | 379/89 |
| 4,837,798 | 6/1989 | Cohen et al. | 379/94 |
| 4,907,274 | 3/1990 | Nomura et al. | 379/100 |
| 4,914,586 | 4/1990 | Swinehart et al. | 379/96 |
| 4,935,954 | 6/1990 | Thompson et al. | 379/88 |

Primary Examiner—James L. Dwyer
Assistant Examiner—Fan Tsang
Attorney, Agent, or Firm—Fitzpatrick, Cella, Harper & Scinto

[57] ABSTRACT

This disclosure relates to a terminal unit for processing voice information which is adopted in a network system for transmitting and receiving voice information. This disclosure also pertains to a group of such terminal units. In a case where a voice converter is not provided in the terminal unit or when the use of the voice converter is suppressed, the terminal unit converts received voice information into a medium other than voice, for example, into characters, and thereby conveys it to a receiver. In a case where the terminal unit which receives the voice information is not provided with the function of converting the received voice information into a medium other than voice, the terminal unit requests another terminal unit within the terminal unit group to convert the voice information into a medium other than voice and thereby conveys it to a receiver.

38 Claims, 7 Drawing Sheets

NETWORK SYSTEMS

This application is a continuation of application Ser. No. 07/654,003 filed Feb. 12, 1991 now abandoned.

BACKGROUND OF THE INVENTION

1. Field of the Invention

The present invention relates to a network system which is capable of transmission and reception of voice information using communication means.

2. Description of the Prior Art

In recent years, voice mail has been used at a practical level. In this voice mail, a message is input in voice using a computer systems, and the input voice information is sent to a local or remote computer through a network. At the local or remote computer, reproduction of the message is performed.

Voice mail is an excellent information transmission media because it has the excellent recordability possessed by document-oriented electric mail, that is, because it is capable of transmission of a message even when an addressee is absent, and because it has the high speed of the information transmitted in voice.

Transmission and reception of voice mail are performed in the manner described below: an audio message is input from a terminal unit provided with a voice input unit generally consisting of a microphone, an A/D converter, and a data compression unit, when necessary. The message is transmitted to the terminal unit which is an addressee in accordance with the transmission procedure of the network in the form of a file. At the terminal unit, which is the addressee, reverse conversion of the transmitted voice mail file is conducted in accordance with the communication protocol between the addressee and the addressor. Thereafter, a D/A converted message passes through an amplifier and then drives a speaker which makes the message audible to a receiver.

Transmission and reception of voice mail require special hardware. For transmission of voice mail, at least a microphone and an A/D converter are necessary. At the reception side, a D/A converter, an amplifier, a speaker and so on are necessary. The fact that the special hardware is required for transmission and reception of voice mail gives rise to a problem in that a transmitted message cannot be conveyed when the reception side of the voice mail does not have a voice reproducing hardware, and in that the cost of the hardware is quite high.

SUMMARY OF THE INVENTION

An object of the present invention is to provide a voice information-oriented network system with a conversion function for converting transmitted voice mail into a medium other than voice when audio reproduction of the voice information is impossible.

According to the present invention, the foregoing object is attained by providing a network system for transmitting and receiving voice information which is connected with a plurality of terminal units capable of converting the received voice information into a medium other than voice and of outputting the converted information.

Another object of the present invention is to provide a voice information-oriented network system which can obtain the information of a voice main in cooperation with another network terminal unit capable of converting the received voice mail into a medium other than voice when voice reproduction and conversion of the received voice mail into a medium other than voice are impossible.

In accordance with the present invention as described above, in a case when the terminal unit which receives the voice information is not provided with the conversion means for converting the voice information into information corresponding to an output medium other than voice, the voice information is transferred for conversion to another terminal unit provided with the conversion means, and the converted information is transferred back again to the terminal unit which receives the voice information. Consequently, even when the terminal unit, which receives the voice information, is not provided with the means for converting the voice information into information corresponding to an output medium other than voice, the information can be received in the medium other than voice.

Another object of the present invention is to provide a terminal unit for voice information provided with a conversion function for converting a transmitted voice mail into a medium other than voice when voice reproduction is impossible.

According to the present invention, the foregoing object is attained by providing a terminal unit connected to a network system for transmitting and receiving voice information. The terminal unit includes reception means for receiving information through the network system, identification means for identifying that the information received by the reception means is voice information, storage means for storing the voice information received by the reception means and identified by the identifying means, conversion means for converting the voice information into information corresponding to an output medium other than voice, and output means for outputting the information converted by the conversion means.

The invention is particularly advantageous because the terminal unit which receives the voice information can convert the voice information into information corresponding to a medium other than voice and output the results of the conversion so as to inform the user the received information even when the terminal unit is not provided with the audio reproduction means.

Furthermore, in a case when the voice information is received by the terminal unit capable of suppressing audio output of the voice information when the audio output is suppressed, since the voice information can be converted into an output medium other than voice, the user can be informed of the content of the received information in the form other than voice. Such a terminal unit is suitable for the site where audio output is a nuisance to other people or for the case when the information is confidential.

Furthermore, even when the voice information is received by the terminal unit which is not provided with the means for converting the voice information into information corresponding to an output medium other than voice, since the voice information can be converted into information corresponding to an output medium other than voice in cooperation with another terminal unit provided with the conversion means, it is not necessary for all the terminal units to be provided with the conversion means. This results in decreasing the production cost.

Furthermore, since conversion of the voice information is executed at the reception site, it is not necessary for the transmission site terminal unit to check whether or not the reception side terminal unit has audio output means when it transmits voice information thereto.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
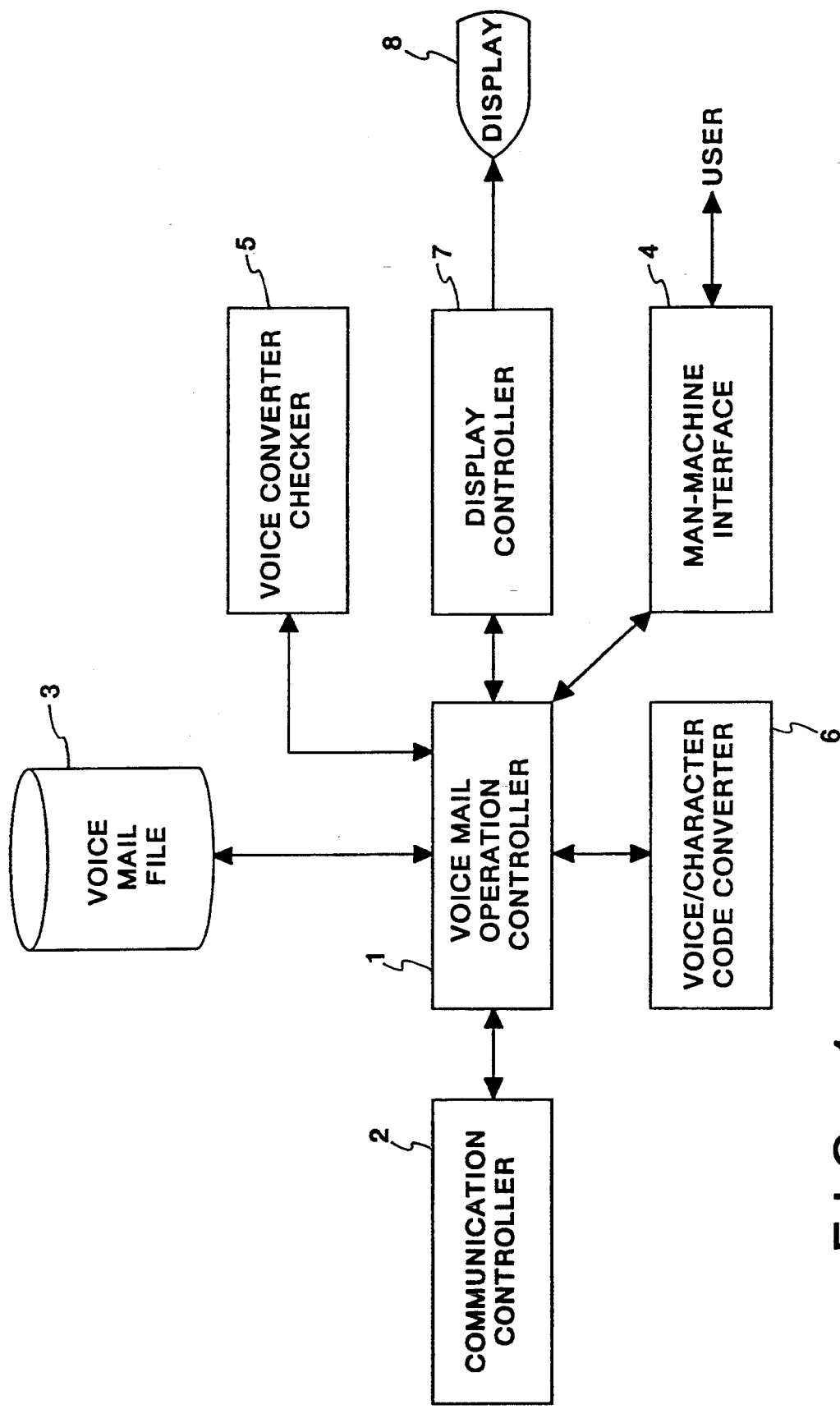
FIG. 1 is a block diagram illustrating a voice mail processing terminal unit which is a typical embodiment of the present invention.

FIG. 1 is a block diagram illustrating a voice mail processing terminal unit used in a network system according to a typical embodiment of the present invention. The terminal unit includes a voice mail operation controller 1 for controlling the operation of a voice mail system, a communication controller 2 for performing communications with other terminal units, a voice mail file 3 for storing voice mails, a man-machine interface 4 for connecting a user to the voice mail system, a voice converter checker 5, a voice/character code converter 6, a display controller 7, and a display unit 8.

Figure 2:
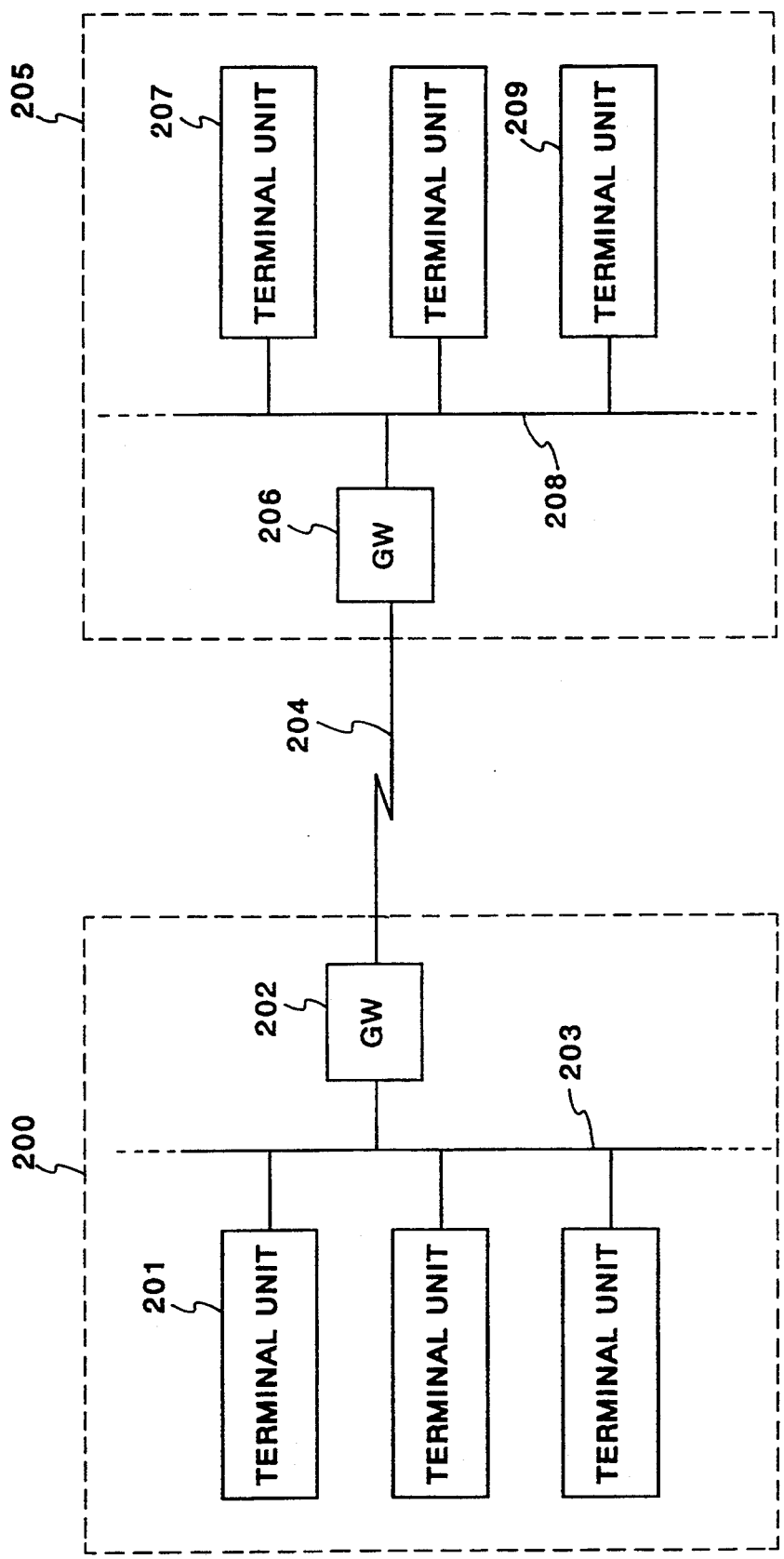
FIG. 2 is an example of a network environment to which the voice mail processing terminal unit is applied.

FIG. 2 shows an example of a network environment to which the above-described voice mail processing terminal unit is applied. In FIG. 2, a reference numeral 200 denotes a computer system installed at a certain site, and a reference numeral 205 denotes a computer system installed at another site. In such a network environment, when voice mail is transmitted from, for example, a terminal unit 201 which belongs to the computer system 200 at a certain site to a terminal unit which belongs to the computer system 205 at another site, the voice information is transmitted on the following channel. That is, the voice mail input from the terminal unit 201 at the site 200 passes through a LAN (local area network) transmission path 203, a GW (gate way) 202 and then a WAN (wide area network) transmission path 204, and then reaches the site 205. At the site 205, the voice mail passes through a GW (gate way) 206 and a LAN (local area network) transmission path 208 and then reaches an addressee terminal unit 207.

In the above-described network environment, the mail system which employs the conventional network technique is required for transmission and reception of mail. The communication protocol of such a mail system is described in, for example, "Handbook on Information Processing" (In Japanese), published by OHM-SHA Ltd., 1989, pp 761–766. The voice mail processing terminal unit shown in FIG. 1 is effective when voice mail has reached terminal unit 207 and when terminal unit 207 is not provided with a voice converter.

Figure 3:
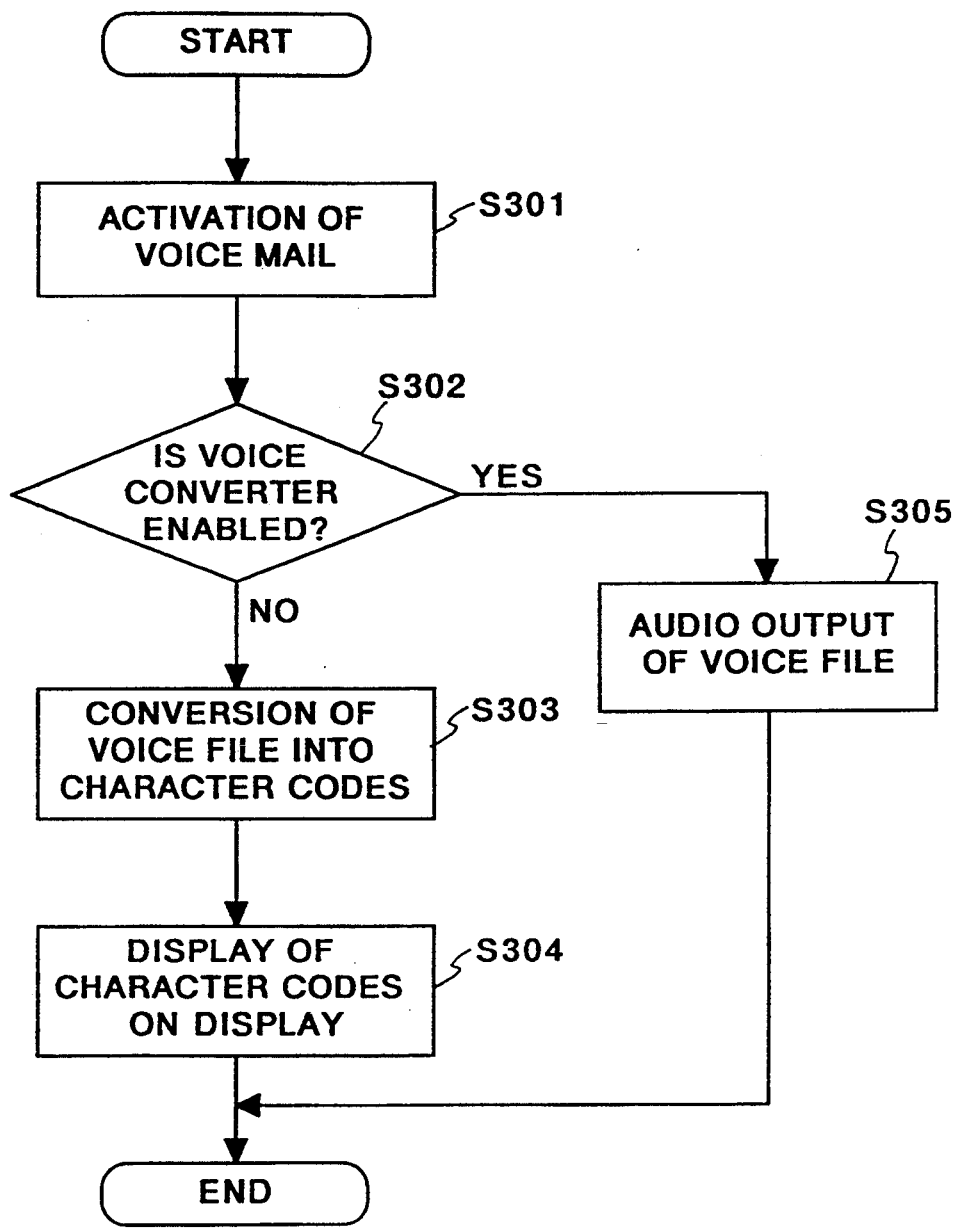
FIG. 3 is a flowchart showing the operation of the voice mail processing terminal unit.

The operation of the voice mail system in this embodiment will now be described with reference to FIG. 3.

Here, it is assumed that voice mail operation controller 1 has already received through communication controller 2 a voice mail message which is sent from another terminal unit through a network (not shown), and that it has stored the message in voice mail file 3.

First, the user activates the voice mail processing terminal unit through the operation of man-machine interface 4 in step S301. Next, the user operates voice mail operation controller 1 in order to listen to the voice mail message, and voice mail operation controller 1 then thereby checks through voice converter checker 5 whether or not audio output of the voice mail message is available in the terminal unit in step S302. If it is identified in step S302 that the voice converter is enabled, the process proceeds to step S305 where voice converter checker 5 returns ready status of voice converter to the voice mail operation controller 1, and the voice file is output from the voice converter. If it is identified in step S302 that the voice converter is disabled, the process proceeds to step S303 where voice converter checker 5 returns not ready status of the voice converter to voice mail operation controller 1, and voice mail operation controller 1 commands the voice/character code converter 6 to convert the voice mail file into character codes. In step S303, voice/character code converter 6 converts the voice mail file read out from the voice mail file by voice mail operation controller 1 into character codes according to the prior art.

Figure 4:
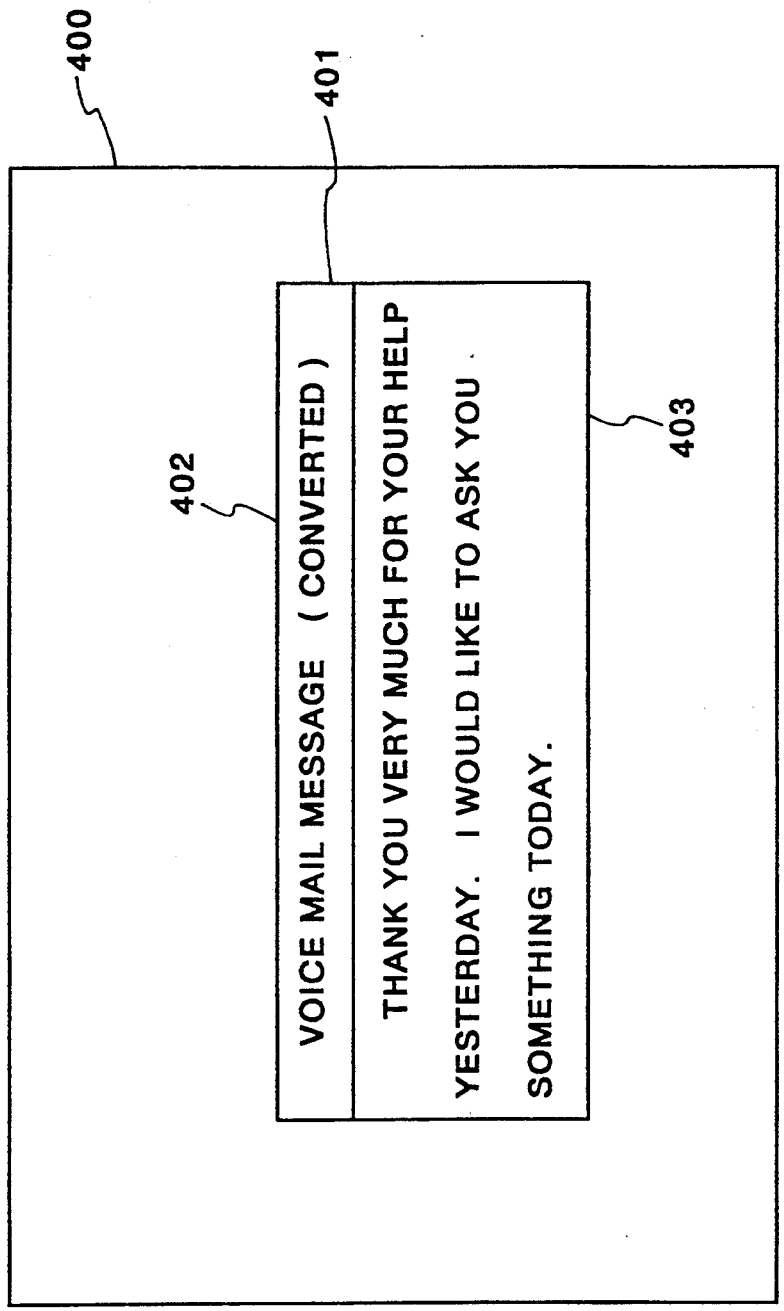
FIG. 4 is an example of a converted voice message displayed on a screen.

Finally, in step S304, voice mail operation controller 1 displays the converted character codes through display controller 7 on a display 8, such as a CRT display device, in the form of characters. At this time, it is preferable that the information is given in a manner such that the message displayed is the one converted from the voice mail into characters, as is shown in FIG. 4. In this way, a difference in the expression between the document and the voice mail is clarified, and mixture of the errors of the addressor with those of conversion can thus be avoided in a case when errors occur in the conversion of voice information into characters.

FIG. 4 shows a typical example of the converted information displayed on a CRT screen 400. A window 401 for displaying the voice mail in characters consists of a header display area 402 and a converted data display area 403. In header area 402, a message, for example,'Voice Mail Message (Converted)' is displayed as header to clearly indicate that the data displayed below is data converted from the voice mail into characters by the voice mail processing terminal unit.

It has been described in the operation of the above voice mail system, particularly, as to the process of step S302, that the voice converter checker 5 detects whether or not the voice converter is enabled. However, the present invention is not limited to the above. For example, an addition of means for suppressing audio output enables the operator to control the audio output, depending on his decision, even though the voice converter is provided in the terminal unit. Hence, the determination made in step S302 may not only be the detection of the presence or absence of the voice converter but also be the determination as to whether or not voice output is suppressed.

Furthermore it has been described in the above embodiment that the received voice mail is converted into characters and the converted characters are displayed on the CRT display. However, the received voice mail may also be output to output media other than the CRT display, such as a printer.

According to this embodiment, in a case where the voice converter is disabled, the user can receive the information carried by the voice mail and avoid confusion caused by the omission of the information, even though the user cannot enjoy the speedy information transmission which characterizes the voice mail.

[Another Embodiment]

In the above-described embodiment, the voice mail system of the terminal unit which receives a voice mail message (which is an addressee) is provided with a voice/character code converter. However, carrying out voice/character code conversion through the use of hardware requires us to equip each terminal unit with expensive hardware, and is hence uneconomical.

To cope with such a problem, a server/client model is employed in this embodiment. Each of the plurality of terminal units in the computer system sites, described in the aforementioned embodiment, constitutes a group having a plurality of terminal units. That is, one terminal unit in each terminal unit group functions as a server so as to centralize the process of converting the voice file into character codes, and other terminal units in the terminal unit group function as client units that display the results of the conversion, so as to decentralize the voice information processing.

Figure 5:
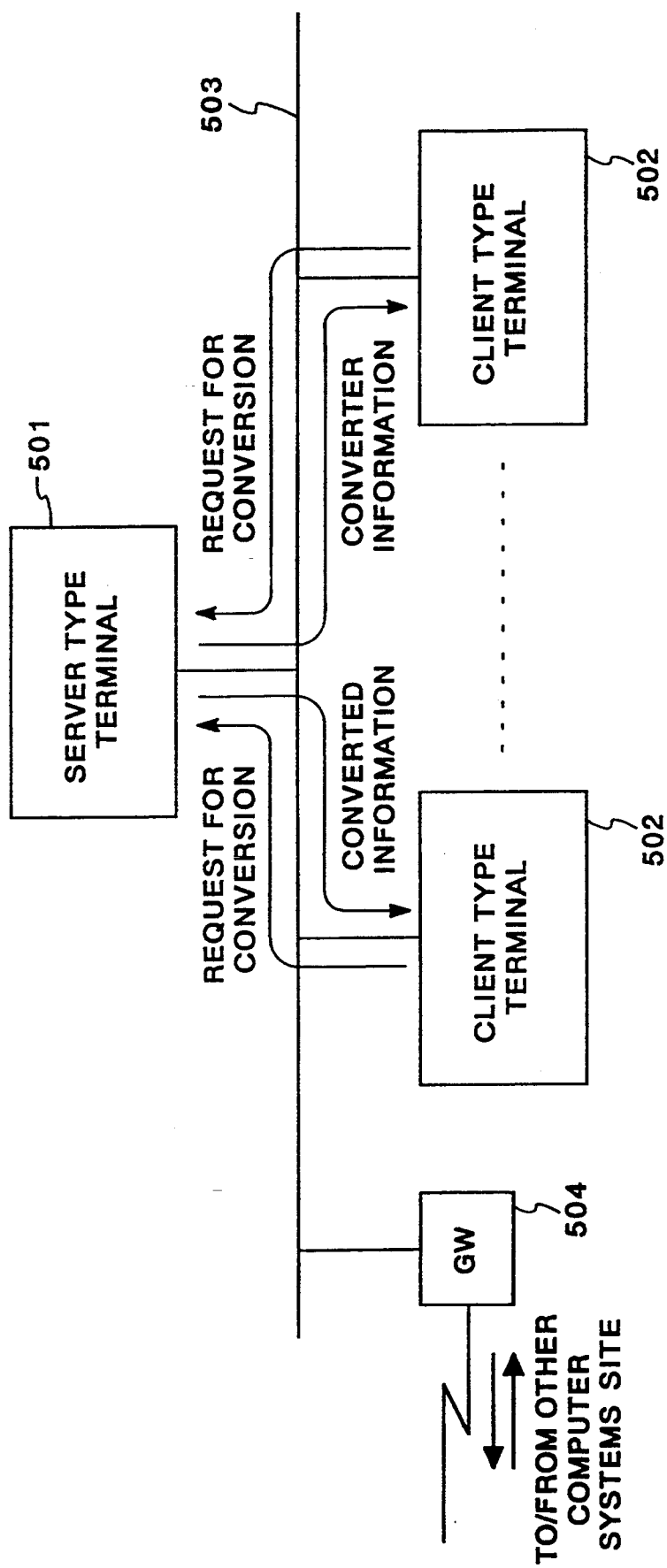
FIG. 5 is a block diagram illustrating a group of processing terminal units according to another embodiment of the present invention.

FIG. 5 is a block diagram illustrating a terminal unit group to which server/client model is applied. In the configuration shown in FIG. 5, communications with the terminal units in other terminal unit groups are carried out through GW (gate way) 504, while communications with other terminals within that terminal unit group are made through transmission path 503 using a LAN, as in the case of the aforementioned embodiment. In such a server/client system, since client type terminal unit 502 is not provided with the function of converting the voice file into character codes, it requests server type terminal unit 501 through transmission path 503 to convert the voice file into character codes.

Figure 6:
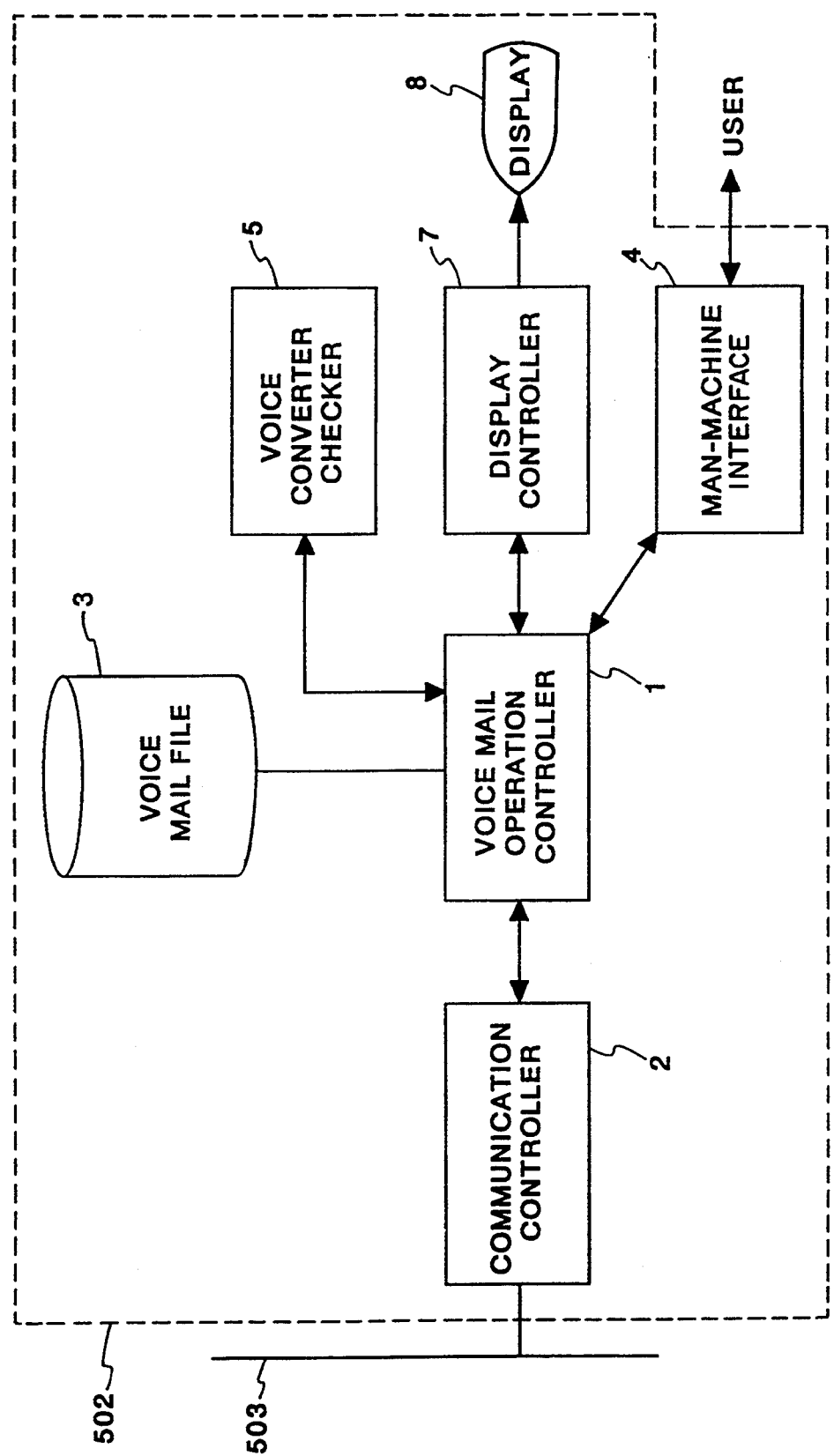
FIG. 6 is a block diagram illustrating a client type voice mail processing terminal unit according to another embodiment of the present invention.

FIG. 6 is a block diagram illustrating terminal unit 502 used as a client in this embodiment. Client type terminal unit 502 used in this embodiment has the same configuration as that of the terminal unit shown in FIG. 1, with the exception that it has no voice/character code converter. Therefore, the same reference numerals are used to denote components which are the same as those shown in FIG. 1, description thereof being omitted. Also, terminal unit 501 used as a server has the same configuration as the terminal unit shown in FIG. 1, and description of the configuration is omitted.

Figure 7:
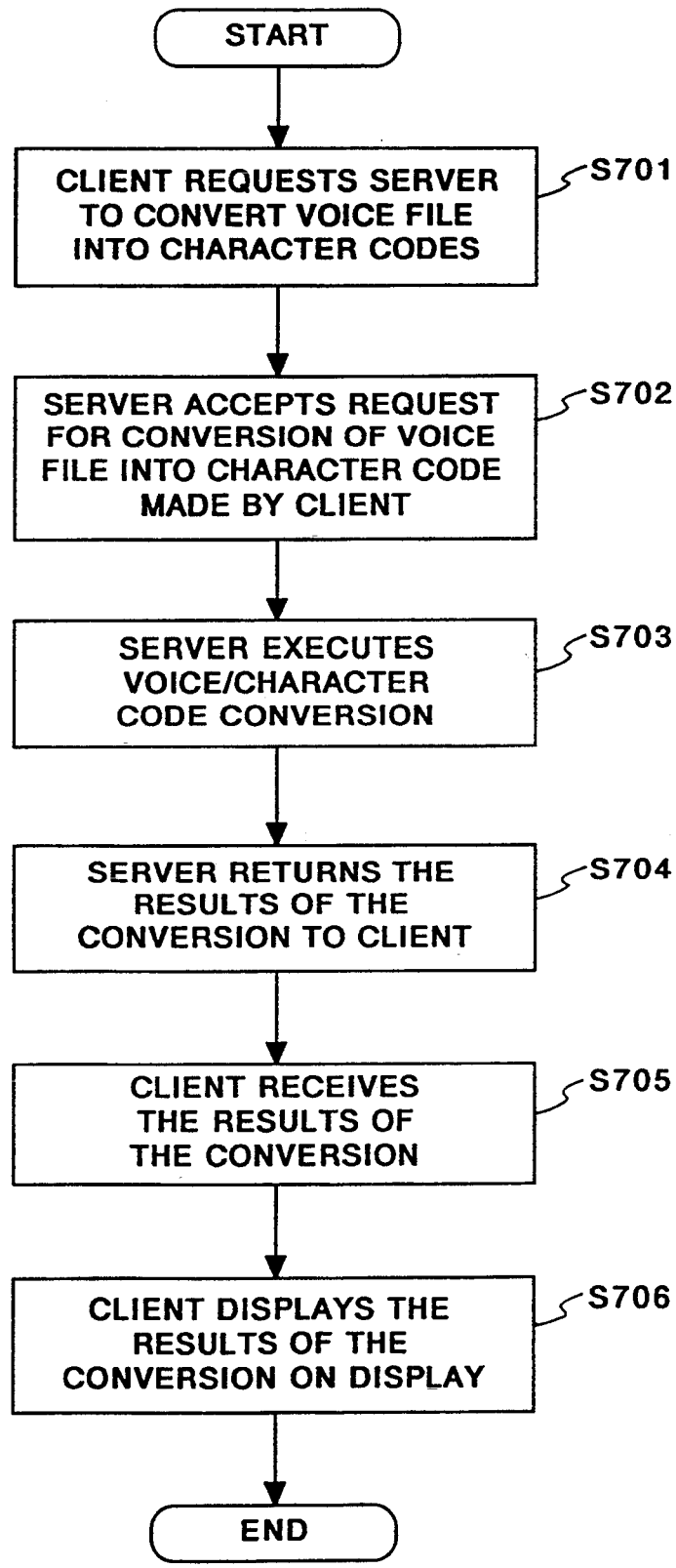
FIG. 7 is a flowchart showing the process of the voice/character code conversion service in a server/client system according to another embodiment of the present invention.

The voice/character code conversion service is offered by the server type terminal unit 501 to client type terminal unit 502 through transmission path 503 in the manner described below with reference to FIG. 7.

First, the user requests the voice/character code conversion from voice mail operation controller 1 of client type terminal unit 502 to server type terminal unit 501 through communication controller 2 and transmission path 503 in step S701. Next, server type terminal unit 501 receives the request from client type terminal unit 502 in step S702, then activates voice/character code converter 6, and thereby executes the voice/character code conversion process in step S703. Subsequently, server type terminal unit 501 returns the results of the conversion to client type terminal unit 502 through transmission path 503 in step S704. In step S705, client type terminal unit 502 receives the results of the conversion through communication controller 2. Finally, in step S706, client type terminal unit 502 displays results such as those shown in FIG. 4 on display 8, using display controller 7.

In this embodiment, the server type terminal unit is of the type which carries out the process of converting the voice file into character codes. However, the server type terminal unit may also be of the type which carries out voice information conversion and displays the results of the conversion in characters.

The functions described in the above-described embodiments may be selectively carried out in terms of either hardware or software. For example, voice mail operation controller 1 and display controller 7, shown in FIG. 1, may be structured as a single software module. Also, voice converter checker 5 may be in the form of a switching variable using software.

As many apparently widely different embodiments of the present invention can be made without departing from the spirit and scope thereof, it is to be understood that the invention is not limited to the specific embodiments thereof except as defined in the appended claims.

What is claimed is:

1. A network system for transmitting and receiving voice information, comprising:

a plurality of terminal units connected to said network system for converting the received voice information into character codes and for outputting the results of the conversion, wherein each of said plurality of terminal units comprises:

reception means for receiving voice information;

conversion means for converting the voice information into character codes;

output means for outputting the information converted by said conversion means;

checking means for checking whether voice information reproduction means for reproducing and outputting the voice information is provided in that terminal unit; and conversion control means for controlling said conversion means in a manner such that said conversion means is activated when said checking means confirms that voice information reproduction means is not provided in the terminal unit.

2. The network system according to claim 1, wherein each of said plurality of terminal units further comprises:

suppression means for suppressing voice reproduction performed by the voice information reproduction means, and wherein said conversion control means further controls said conversion means in a manner such that it converts the voice information into character codes where reproduction by the voice information reproduction means is suppressed.

3. The network system according to claim 1, wherein said output means has display means for displaying the character codes in characters.

4. The network system according to claim 3, wherein said display means has notification means for notifying that the displayed characters are originally voice information.

5. The network system according to claim 4, wherein said notification means comprises:
   window generation means for generating a window for defining a predetermined display area within a display area of said display means;
   division means for dividing the window generated by said window generation means into two areas; and
   window display control means for controlling such that notification for notifying that the displayed characters are originally voice information is displayed on one of the areas divided by said division means, while the characters converted from the voice information are displayed on the other area.

6. A network system for transmitting and receiving voice information, comprising:
   a plurality of terminal units connected to the system,
   wherein a subset of said plurality of terminal units which are located close to each other constitutes a group of terminal units, and each of said terminal unit groups includes:
   first communication means for transmitting information to and receiving information from the other terminal unit groups, and
   conversion means for converting received voice information into character codes,
   wherein said conversion means resides on a terminal unit in each of said terminal unit groups in order to centralize the conversion processing in each group,
   wherein each terminal unit group includes one server type terminal unit having a computer for executing a specified job, at least one client type terminal unit having a computer for requesting said server type terminal unit to execute the specified job by sending necessary data and for receiving a result of the specified job, and a communication path for connecting said server type terminal unit, said one client type terminal unit and said first communication means, and
   wherein said server type terminal unit includes said conversion means for converting the voice information.

7. The network system according to claim 6, wherein each of said client type terminal units comprises:
   second communication means connected to said communication path for transmitting information to and receiving information from the other terminal units, within the terminal unit group and for transmitting information to and receiving information from the other terminal unit groups through said first communication means;
   storage means for storing the voice information;
   request means for reading out the voice information from said storage means and for requesting voice information conversion to said server type terminal unit; and
   output means for receiving the results of the voice information conversion from said server type terminal unit and for outputting the results of the voice information conversion.

8. The network system according to claim 7, wherein said output means comprises:
   display control means for controlling the display of the results of the voice information conversion; and
   display means for displaying the results of the voice information conversion in characters on the basis of the control of said display control means.

9. The network system according to claim 8, wherein said display means has notification means for notifying that the displayed characters were originally voice information.

10. The network system according to claim 9, wherein said information means comprises:
    window generation means for generating a window for defining a predetermined display area within a display area displayed by said display means;
    division means for dividing the window generated by said window generation means into two areas; and
    window display control means for controlling such that notification for notifying that the displayed characters were originally voice information is displayed on one of the areas divided by said division means while the characters converted from the voice information are displayed on the other area.

11. The network system according to claim 6, wherein each of said server type terminal units comprises:
    third communication means connected to said communication path for transmitting information to and receiving information from the other terminal units within the terminal unit group and for transmitting information to and receiving information from the other terminal unit groups through said first communication means;
    acceptance means for accepting the request for conversion of the voice information which is transmitted from said client type terminal unit;
    control means for controlling said conversion means in a manner such that said conversion means is activated on the basis of the conversion request of the voice information accepted by said acceptance means; and
    transmission request means for requesting said third communication means to transmit the information converted from the voice information by said conversion means to said client type terminal unit.

12. The network system according to claim 11, wherein said conversion means is adapted to convert the voice information into corresponding character codes.

13. The network system according to claim 6, wherein said communication path comprises a LAN (local area network).

14. A network system for transmitting and receiving voice information, comprising:
    a plurality of terminal units connected to the system,
    wherein subset of said plurality of terminal units which are located close to each other constitutes a group of terminal units, and each of said terminal unit groups includes:
    first communication means for transmitting information to and receiving information from the other terminal unit groups, and
    conversion means for converting received voice information into character codes, wherein said conversion means resides on a terminal unit in each of said terminal unit groups in order to centralize the conversion processing in each groups, and wherein said first communication means comprises a gate way for accepting information from the terminal unit within the terminal unit group to which said first communication means belongs, transmitting the information to the other terminal unit groups, receiving information from the other terminal unit groups, and distributing the information to the terminal unit within the terminal unit group to which said first communication means belongs.

15. A terminal unit connected to a network system for transmitting and receiving voice information, said terminal unit comprising:

reception means for receiving voice information through said network system;

conversion means for converting the voice information into character code information to be outputted;

output means for outputting the information converted by said conversion means;

checking means for checking whether voice information reproduction means for reproducing and outputting the voice information is provided in the terminal unit; and conversion control means for controlling said conversion means in a manner such that said conversion means is activated when said checking means confirms that voice information reproduction means is not provided in the terminal unit.

16. The terminal unit according to claim 15, further comprises:

voice information reproduction means for reproducing and outputting the voice information;

suppression means for suppressing voice reproduction preformed by said voice information reproduction means; and conversion control means for determining whether or not reproduction by said voice information reproduction means is suppressed and for controlling said conversion means such that it converts the voice information into character code information.

17. The terminal unit according to claim 15, wherein said conversion means is adapted to convert the voice information into corresponding character codes, and wherein said output means has display means for displaying the character codes in characters.

18. The terminal unit according to claim 17, wherein said display means has notification means for notifying that the displayed characters were originally voice information.

19. The terminal unit according to claim 18, wherein said notification means comprises:

window generation means for generating a window for defining a predetermined display area within a display area of said display means;

division means for dividing the window generated by said window generation means into two area; and window display control means for controlling such that notification for notifying that the displayed characters were originally voice information is displayed on one of the areas divided by said division means, while the characters converted from the voice information are displayed on the other area.

20. A data processing method performed by a plurality of terminal units connected to a network system for transmitting and receiving voice information comprising:

a reception step of receiving the voice information;

a checking step of checking whether voice information reproduction facilities for reproducing and outputting the voice information is provided in that terminal unit;

a converting step of converting the received voice information into character code information;

a conversion control step of controlling said conversion step in a manner such that said conversion step is performed when said checking step confirms that voice information reproduction facilities are not provided in the terminal unit; and an outputting step of outputting the results of the conversion.

21. The method according to claim 20, further comprising a reproduction step wherein the voice information reproduction facilities reproduce the voice information, and a suppression step of suppressing voice reproduction performed by the voice information reproduction facilities, wherein said conversion control step further controls said converting step in a manner such that it converts the voice information into character codes when reproduction by the voice information reproduction facilities is suppressed.

22. The method according to claim 20, wherein said outputting step includes a display step of displaying the character codes as characters.

23. The method according to claim 22, wherein said display step includes a notification step of notifying that the displayed characters represent originally voice information.

24. The method according to claim 23, wherein said notification step comprises:

a window generation step of generating a window for defining a predetermined display area within a display area in said display step;

a division step of dividing the window generated by said window generation step into two areas; and a window display control step of controlling such that notification of notifying that the displayed characters represent originally voice information is displayed on one of the areas divided by said division step, while the characters converted from the voice information are displayed on the other area.

25. A data processing method performed by a plurality of terminal units connected to a network system for transmitting and receiving voice information, comprising:

a configuration step of configuring a subset of the plurality of terminal units which are located close to each other as a group of terminal units;

a communication step of transmitting information to and receiving information from the other terminal unit groups; and a conversion step of converting received voice information into character codes within each of the terminal units groups, wherein said conversion step is performed in a unit in each of said terminal unit groups in order to centralize the conversion processing in each group, wherein each terminal unit group includes one server type terminal unit having a computer for executing a specified job, at least one client type terminal unit having a computer for requesting said server type terminal unit to execute the specified job by sending necessary data and for receiving a result of the specified job, and a communication path for connecting said server type terminal unit, said one client type terminal unit and a first communication unit used by said communication step, and wherein said server type terminal unit includes a conversion unit used by said conversion step for converting the voice information.

26. The method according to claim 25, wherein each of said client type terminal units performs:

a second communication step, when connected to said communication path, of transmitting information to and receiving information from the other terminal units within the terminal unit group and for transmitting information to the receiving information from the other terminal unit groups through said first communication step;

a storage step of storing the voice information;

a request step of reading out the voice information stored by said storage step and for requesting voice information conversion to said server type terminal unit; and an output step of receiving the results of the voice information conversion from said server type terminal unit and for outputting the results of the voice information conversion.

27. The method according to claim 26, wherein said output step comprises:

a display control step of controlling a display of the results of the voice information conversion; and a display step of displaying the results of the voice information conversion as characters on the basis of the control of said display control step.

28. The method according to claim 27, wherein said display step has a notification step of notifying that the display characters represent originally voice information.

29. The method according to claim 28, wherein said notification step comprises:

a window generation step of generating a window for defining a predetermined display area within a display area displayed in said display step;

a division step of dividing the window generated by said window generation step into two areas; and a window display control step of controlling such that notification for notifying that the displayed characters were originally voice information is displayed on one of the areas divided by said division step while the characters converted from the voice information are displayed on the other area.

30. The method according to claim 25, wherein each of said server type terminal units performs:

a third communication step, when connected to said communication path, of transmitting information to and receiving information from the other terminal units within the terminal unit group and for transmitting information to and receiving information from the other terminal unit groups through said communication step;

an acceptance step of accepting the request for conversion of the voice information which is transmitted from said client type terminal unit;

a control step for controlling said conversion step in a manner such that said conversion step is activated on the basis of the conversion request of the voice information accepted by said acceptance step; and a transmission request step of requesting said third communication step to transmit the information converted from the voice information by said conversion step to said client type terminal unit.

31. The method according to claim 30, wherein said conversion step converts the voice information into corresponding character codes.

32. The method according to claim 25, wherein said communication path comprises a local area network.

33. A data processing method performed by a terminal unit connected to a network system for transmitting and receiving voice information comprising:

a reception step of receiving voice information through the network system;

a checking step of checking whether voice information reproduction facilities for reproducing and outputting the voice information as provided in the terminal unit;

a conversion step of converting the voice information into information corresponding to character code information;

a conversion control step of controlling said conversion step in a manner such that said conversion step is performed when it is confirmed by said checking step that said voice information reproduction facilities are not provided in the terminal unit; and an output step of outputting the information converted in said conversion step.

34. The method according to claim 33, further comprising:

a voice information reproduction step of reproducing and outputting the voice information;

a suppression step of suppressing voice reproduction performed by said voice information reproduction step; and a conversion control step of determining whether or not reproduction by said voice information reproduction step is suppressed and for controlling said conversion step to convert the voice information into character code information.

35. The method according to claim 33, wherein said conversion step converts the voice information into corresponding character codes, and wherein said output step has a display step of displaying the character codes as characters.

36. The method according to claim 35, wherein said display step has a notification step of notifying that the displayed characters represent originally voice information.

37. The method according to claim 36, wherein said notification step comprises:

a window generation step of generating a window for defining a predetermined display area within a display area in said display step;

a division step of dividing the window generated by said window generation step into two areas; and a window display control step of controlling such that notification for notifying that the displayed characters were originally voice information is displayed on one of the areas divided by said division step, while the characters converted from the voice information are displayed on the other area.

38. A data processing method performed by a plurality of terminal units connected to a network system for transmitting and receiving voice information, comprising:

a configuration step of configuring a subset of the plurality of terminal units which are located close to each other as a group of terminal units;

a communication step of transmitting information to and receiving information from the other terminal unit groups; and a conversion step of converting received voice information into character codes within each of the terminal units groups, wherein the conversion step is performed in a terminal unit in each of said terminal unit groups in order to centralize the conversion processing in each group, wherein said communication step comprises a step of accepting information from the terminal unit within the terminal unit group to which said communication step belongs, transmitting the information to the other terminal unit groups, receiving information from the other terminal unit groups, and distributing the information to the terminal unit within the terminal unit group to which said communication step belongs.

* * * * *

UNITED STATES PATENT AND TRADEMARK OFFICE
CERTIFICATE OF CORRECTION

PATENT NO. : 5,381,466
DATED : January 10, 1995
INVENTOR(S) : SHIGEKI SHIBAYAMA, ET AL.

It is certified that error appears in the above-identified patent and that said Letters Patent is hereby corrected as shown below:

COLUMN 1

Line 15, "systems," should read --system,--.

COLUMN 7

Line 58, "units," should read --units--.

COLUMN 8

Line 60, "subset" should read --a subset--.

COLUMN 9

Line 4, "groups" should read --group--.
Line 61, "area;" should read --areas;--.

COLUMN 10

Line 63, "unit" should read --terminal unit--.

UNITED STATES PATENT AND TRADEMARK OFFICE
CERTIFICATE OF CORRECTION

PATENT NO. : 5,381,466
DATED : January 10, 1995
INVENTOR(S) : SHIGEKI SHIBAYAMA, ET AL.

It is certified that error appears in the above-identified patent and that said Letters Patent is hereby corrected as shown below:

COLUMN 12

Line 17, "as" should read --is--.

Signed and Sealed this

Sixth Day of June, 1995

Attest:

BRUCE LEHMAN

Attesting Officer     Commissioner of Patents and Trademarks